United States Patent Office 3,472,837
Patented Oct. 14, 1969

3,472,837
UNSATURATED NUCLEOSIDES AND PROCESS
FOR THEIR PREPARATION
Julien P. Verheyden and John G. Moffatt, Los Altos,
Calif., assignors to Syntex Corporation, Panama, Panama, a corporation of Panama
No Drawing. Filed Oct. 10, 1966, Ser. No. 585,307
Int. Cl. C07d 51/52, 51/54
U.S. Cl. 260—211.5    11 Claims

ABSTRACT OF THE DISCLOSURE

Novel unsaturated derivatives of ribonucleosides and deoxyribonucleosides by formation of a 5'-deoxy-5'-iodo derivative followed by treatment with silver fluoride. The compounds are useful in producing metabolic deficiencies in biological systems.

---

The present invention is directed at novel organic compounds. In particular the present invention pertains to novel unsaturated derivatives of ribonucleosides and deoxyribonucleosides.

The compounds of the present invention may be represented by the following structural formula:

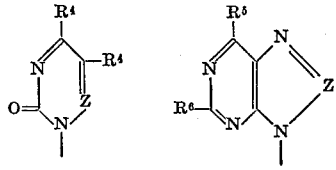

in which $R^1$ is hydrogen or (lower) alkanoyl, and
$R^2$ is hydrogen, hydroxy or (lower) alkanoyloxy, and
X is a purine or pyrimidine base of the structure:

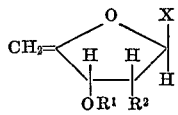

in which $R^3$ is hydroxy or amino;
$R^4$ is hydrogen, bromo, chloro, iodo, fluoro, methyl, trifluoromethyl or hydroxymethyl;
$R^5$ is hydroxy or amino;
$R^6$ is hydrogen, amino or hydroxy; and
Z is methylidyne or nitrogen.

In the foregoing, X is a purine or pyrimidine base. The pyrimidine base may have the normal ring structure (Z=methylidyne) and thus be cytosine ($R^3=NH_2$, $R^4=H$); uracil ($R^3=OH$, $R^4=H$); thymine ($R^3=OH$, $R^4=CH_3$); 5-methylcytosine ($R^3=NH_2$, $R^4=CH_3$); 5-hydroxymethyluracil ($R^3=OH$, $R^4=CH_2OH$); 5-hydroxymethylcytosine ($R^3=NH_2$, $R^4=CH_2OH$); 5 - bromouracil ($R^3=OH$, $R^4=Br$); 5-bromocytosine ($R^3=NH_2$, $R^4=Br$); 5-chlorouracil ($R^3=OH$, $R^4=Cl$); 5-chlorocytosine ($R^3=NH_2$, $R^4=Cl$); 5-trifluoromethyluracil ($R^3=OH$, $R^4=CF_3$); 5-trifluoromethylcytosine ($R^3=NH_2$, $R^4=CF_3$); and the like; may have the 6-azapyrimidine structure (Z=nitrogen) or may be a purine such as guanine ($R^5=OH$, $R^6=NH_2$); adenine ($R^5=NH_2$, $R^6=H$); 2,6-diaminopurine ($R^5=R^6=NH_2$); xanthine ($R^5=R^6=OH$); hypoxanthine ($R^5=OH$, $R^6=H$); or the like as well as the corresponding 8-azapurine structures.

Particularly preferred bases include adenine, guanine, cytosine, uracil (especially when $R^2$ is hydroxy) and thymine.

The compounds of this invention exhibit antimetabolic properties and are accordingly useful in producing metabolic deficiencies in biological systems as for example in the growth of various microorganisms and other undesirable systems. Moreover, these compounds can be used as chemical intermediates in preparing analogs of naturally occuring nucleosides.

The compounds of the present invention are prepared through initial formation of 5'-deoxy-5'-iodo derivative followed by treatment of this iodo derivative with silver fluoride. This reaction is generally conducted under anhydrous conditions in suitable inert organic solvents, as for example pyridine, 2,6-lutidine, collidine, 2-picoline and the like. The reaction proceeds at normal room temperature, as for example about 25° C, and generally is complete under these conditions in from about 24 to about 96 hours.

Generally hydroxy groups in the 3'- and 2'-positions are protected as for example through formation of esters such as the acetate or benzoate or through the formation of a cyclic carbonate. Hydroxy groups or amino groups in the purine or pyrimidine base are similarly protected, preferably, through the formation of similar esters or the corresponding amides. Hydrolysis of these esters or amides with regeneration of the hydroxy group or amino group is readily achieved for example through treatment with concentrated aqueous ammonium hydroxide.

Many of the requisite 5'-deoxy-5'-iodo starting materials are known. Those which are not known per se may be prepared via conventional methods. Thus for example a 5'-hydroxy starting material, in which other hydroxy groups are protected through esterification, is converted to the corresponding 5'-tosylate. This tosylate is then treated with sodium iodide, the tosylate group being displaced by an iodo group. In the case of some derivatives, notably those having a purine base, the displacement reaction is advantageously executed in acetic anhydride. Alternatively, in the case of the pyrimidine derivatives, iodination of an O,N-acylated nucleoside is achieved through the action of methyl triphenoxyphosphonium iodide.

The following examples will serve to further typify the nature of this invention but should not be construed as a limitation on the scope thereof.

EXAMPLE 1

To a solution of 10 g. of uridine in 100 ml. of pyridine are added 11.4 g. of triphenylmethyl chloride. This mixture is held at about 25° C. for 48 hours and then at 100° C. for 3 hours. Eighty milliliters of acetic anhydride are then added to the cooled solution and this mixture is allowed to stand at about 25° C. for 20 hours and then poured into a stirred mixture of 800 ml. of ice and water. The solid is collected, dried and refluxed with 90 ml. of 80% acetic acid for 7 minutes. This mixture is then concentrated under reduced pressure, diluted with 200 ml. of water, washed 3 times with 70 ml. portions of benzene, and concentrated to about 100 ml. Extraction with ethyl acetate and concentration of these extracts gives 2',3'-di-O-acetyluridine which may be further purified through recrystallization from acetone-ether.

A mixture of 6.4 g. of 2',3'-di-O-acetyluridine, 13 g. of methyl triphenoxyphosphonium iodide and 100 ml. of dimethylformamide is allowed to stand 2 hours at about 25° C. The mixture is evporated to dryness and the residue is then partitioned between chloroform and water and the extracts are concentrated to dryness in vacuo. The solid thus obtained is recrystallized from chloroform-hexane to yield 2',3'-di-O-acetyl-5'-deoxy-5'-iodouridine.

A solution of 1 g. of 2',3'-di-O-acetyl-5'-deoxy-5'-iodouridine in 20 ml. of pyridine is treated with 685 mg. of silver fluoride. The reaction mixture is agitated in the dark and at about 25° C. for 96 hours under anhydrous conditons. The suspension is then filtered and the filtrate is evaporated to a syrup. Upon the addition of ethyl acetate (about 50 ml.), a yellow solid forms. Fifty milliliters of water are then added and the resulting suspension is agitated until most of the solid has passed into the solution. The mixture is filtered and the ethyl acetate phase is evaporated to dryness. Preparative thin layer chromatography employing ethyl acetate as the eluant yields 1 - (2,3 - di - O-acetyl-5-deoxy-β-D-erythropent-4-enofuranosyl)-uracil.

A solution of this diacetate in a mixture of 4.5 ml. of methanol and 4.5 ml. of concentrated aqueous ammonium hydride is allowed to stand at room temperature for 1 hour. The solution is evaporated to dryness and the residue is held at −18° until solidificaiton occurs, thereby yielding 1 - (5 - deoxy-β-D-erythropent-4-enofuranosyl)-uracil which is recrystallized from acetone.

In a like fashion by substituting cytidine, thymidine, and 2′-deoxycytidine in the foregoing procedure, there are respectively obtained:

1-(5-deoxy-β-D-erythropent-4-enofuranosyl)cytosine;
1-(2,5-dideoxy-β-D-erythropent-4-enofuranosyl)thymine; and
1-(2,5-dideoxy-β-D-erythropent-4-enofuranosyl)cytosine.

Likewise, the acetates of the following derivatives are substituted in the foregoing procedure: 2′-deoxyuridine, 2′ - deoxy - 5-fluorouridine, 2′-deoxy-5-iodouridine, 2′-deoxy - 5 - trifluoromethyluridine, 2′-deoxy-5-fluorocytidine, 2′ - deoxy - 5 - chlorocytidine, 5-hydroxymethyluridine, 6-azauridine and 6-azacytidine.

Thus respectively prepared are the following:

1-(2,5-dideoxy-β-D-erythropent-4-enofuranosyl)uracil;
1-(2,5-dideoxy-β-D-erythropent-4-enofuranosyl)-5-fluorouracil;
1-(2,5-dideoxy-β-D-erythropent-4-enofuranosyl)-5-iodouracil;
1-(2,5-dideoxy-β-D-erythropent-4-enofuranosyl)-5-trifluoromethyluracil;
1-(2,5-dideoxy-β-D-erythropent-4-enofuranosyl)-5-fluorocytosine;
1-(2,5-dideoxy-β-D-erythropent-4-enofuranosyl)-5-chlorocytosine;
1-(5-deoxy-β-D-erythropent-4-enofuranosyl)-5-hydroxymethyluracil;
1-(5-deoxy-β-D-erythropent-4-enofuranosyl)-6-azauracil; and
1-(5-deoxy-β-D-erythropent-4-enofuranosyl)-6-azacytosine.

EXAMPLE 2

A solution of 267 mg. of adenosine in 1.5 ml. of dimethylformamide is treated with 90 mg. of phenol and 300 mg. of diphenylcarbonate. This mixture is heated at 150° C. for 30 minutes and then poured into 50 ml. of ether. The solid which forms is collected by filtration and washed with ether to yield adenosine 2′,3′-carbonate.

A solution of 293 mg. of this carbonate in 5 ml. of pyridine is cooled in an ice bath and treated with 209 mg. of p-toluenesulfonyl chloride. This mixture is shaken vigorously for 5 minutes and then allowed to stand at about 25° C. for 10 hours. The residue obtained upon evaporation for the pyridine at room temperature and under reduced pressure is extracted with 10 ml. of chloroform and 15 ml. of 3 N sulfuric acid. The chloroform extracts are in turn extracted with 15 ml. of 3 N sulfuric acid, 20 ml. of water and two 20 milliliter portions of saturated sodium bicarbonate solution. Concentration of the chloroform extracts in vacuo yield a residue which is dissolved in 10 ml. of chloroform. The slow addition of hexane then yields 5′-O-tosyl-adenosine-2′,3′-carbonate which is collected by filtration. A solution of 447 mg. of this tosylate in 8 ml. of acetic anhydride is treated with 60 ml. of sodium iodide. This solution is heated at 100° C. for 10 minutes, cooled, and diluted with 10 mg. of chloroform. The chloroform solution is washed with sodium sulfiite solution in water and then evaporated under reduced pressure to yield 5′-deoxy 5′-iodoadenosine 2′,3′-carbonate which may be further purified via recrystallization from chloroform and hexane. Upon substitution of this compound for 2′,3′-di-O-acetyl-5′-deoxy 5′-iodouridine in the procedure of Example 1 there is obtained upon completion of the steps therein described 9-(5-deoxy-β-D-erythropent-4-enofuranosyl)adenine.

In a like fashion, starting with guanosine and 8-azaguanosine there are respectively obtained according to the procedures of this example;

9-(5-deoxy-β-D-erythropent-4-enofuranosyl)guanine and
8-aza-9-(5-deoxy-β-D-erythropent-4-enofuranosyl)guanine.

What is claimed is:
1. Compounds of the formula:

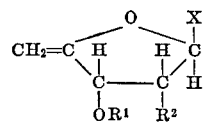

wherein

R¹ is hydrogen or (lower)alkanoyl;
R² is hydrogen, hydroxy or (lower)alkanoyloxy
X is a purine or pyrimidine base of the structure.

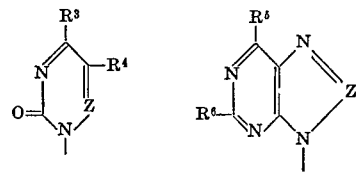

in which

R₃ is hydroxy or amino;
R⁴ is hydrogen, bromo, chloro, iodo, fluoro, methyl, trifluoromethyl or hydroxymethyl;
R₅ is hydroxy or amino;
R₆ is hydrogen, amino or hydroxy; and
Z is methylidyne or nitrogen.

2. 1 - (5 - deoxy - β - D - erythropent-4-enofuranosyl) uracil.
3. 9-(5-deoxy - β - D - erythropent - 4 - enofuranosyl) guanine.
4. 9 - (5 - deoxy - β - D - erthyropent-4-enofuranosyl) adenine.
5. 1-(5-deoxy-β-D-erythropent-4-enofuranosyl)cytosine.
6. 1-(5′-deoxy-β-D-erythropent-4-enofuranosyl)thymine.
7. 1 - (2,5 - dideoxy-β-D-erythropent-4-enofuranosyl) thymine.
8. 9 - (2,5 - dideoxy - β-D-erythropent-4-enofuranosyl) guanine.
9. 9 - (2,5 - dideoxy - β-D-erythropent-4-enofuranosyl) adenine.
10. 1 - (2,5 - dideoxy-β-D-erythropent-4-enofuranosyl) cytosine.
11. 1 - (2,5 - dideoxy-β-D-erythropent-4-enofuranosyl) uracil.

References Cited
UNITED STATES PATENTS 3,180,859  4/1965  Hoeksema _____ 260—211.5
3,207,750  9/1965  De Boer et al. _____ 260—211.5

LEWIS GOTTS, Primary Examiner
JOHNNIE R. BROWN, Assistant Examiner

U.S. Cl. X.R.
260—999